US012744570B2

(12) United States Patent
Liu et al.

(10) Patent No.: US 12,744,570 B2
(45) Date of Patent: Sep. 22, 2026

(54) USER PAIRING METHOD AND APPARATUS, ELECTRONIC DEVICE, AND STORAGE MEDIUM

(71) Applicant: ZTE CORPORATION, Shenzhen (CN)

(72) Inventors: Xiangfeng Liu, Shenzhen (CN); Zhiyuan Lin, Shenzhen (CN); Wei Lin, Shenzhen (CN); Hua Rui, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 287 days.

(21) Appl. No.: 18/688,332

(22) PCT Filed: Aug. 22, 2022

(86) PCT No.: PCT/CN2022/113998
§ 371 (c)(1),
(2) Date: Feb. 29, 2024

(87) PCT Pub. No.: WO2023/030074
PCT Pub. Date: Mar. 9, 2023

(65) Prior Publication Data

US 2024/0380456 A1 Nov. 14, 2024

(30) Foreign Application Priority Data

Aug. 31, 2021 (CN) ......................... 202111012498.X

(51) Int. Cl.
*H04B 7/06* (2006.01)

(52) U.S. Cl.
CPC ......... *H04B 7/0617* (2013.01); *H04B 7/0696* (2023.05)

(58) Field of Classification Search
CPC .. H04B 7/0695; H04B 7/0617; H04B 7/0452; H04B 7/06
See application file for complete search history.

(56) References Cited

U.S. PATENT DOCUMENTS

2017/0264355 A1 9/2017 Zhang et al.
2023/0208478 A1* 6/2023 Sung .................. H04W 72/566 375/262

FOREIGN PATENT DOCUMENTS

CN 105406905 A 3/2016
CN 105681007 A 6/2016
(Continued)

OTHER PUBLICATIONS

BeamRaster: A Practical Fast Massive MU-MIMO System With Pre-Computed Precoders (IEEE) Meng Meng; Wencong Xiao; Tong He; Yuechen Tao Department of Computer Science, The Hong Kong University of Science and Technology, Hong Kong; Kun Tan; Jiansong Zhang (Year: 2019).*
(Continued)

*Primary Examiner* — Kevin M Cunningham
(74) *Attorney, Agent, or Firm* — NZ Carr Law Office

(57) ABSTRACT

Embodiments of the present application relates to the technical field of communication, and in particular to a user pairing method and apparatus, an electronic device, and a storage medium. The user pairing method includes: obtaining beam domain rasters to which users in a set of paired users belong, and a target beam domain raster to which a user to be paired belongs, wherein the beam domain rasters to which the paired users belong are different from the target beam domain raster; obtaining correlations between the target beam domain raster and the beam domain rasters respectively; and in response to that the correlations satisfy a preset condition, adding the user to be paired into the set of paired users.

17 Claims, 3 Drawing Sheets

(56) References Cited

FOREIGN PATENT DOCUMENTS

| | | | |
|---|---|---|---|
| CN | 109921835 | A | 6/2019 |
| CN | 111418162 | A | 7/2020 |
| EP | 3193463 | A1 | 7/2017 |
| JP | 2017532853 | A | 11/2017 |
| WO | 2016041402 | A1 | 3/2016 |

OTHER PUBLICATIONS (ISA/237) Written Opinion of the International Searching Authority dated Oct. 28, 2022.

International search report of the corresponding PCT Application No. PCT/CN2022/113998 mailed on Oct. 28, 2022 along with English translation thereof.

EESR of the corresponding EP Patent Application No. 22863213.9 dated Nov. 27, 2024.

Office Action of the corresponding IN Patent Application No. 202417018607 dated Jan. 16, 2026.

* cited by examiner

USER PAIRING METHOD AND APPARATUS, ELECTRONIC DEVICE, AND STORAGE MEDIUM

CROSS REFERENCE TO RELATED APPLICATIONS

The present application is proposed based on International Application No. PCT/CN2022/113998, filed on Aug. 22, 2022, which claims priority to Chinese patent application No. 202111012498.X, filed on Aug. 31, 2021. The disclosures of the aforementioned applications are hereby incorporated by reference in their entireties.

TECHNICAL FIELD

Embodiments of the present application relates to the field of communications, and in particular to a user pairing method and apparatus, an electronic device, and a storage medium.

BACKGROUND

In a wireless communication system, multi-user multi-input multi-output (MU-MIMO) can serve multiple users with the same time-frequency resource, and through the multiplexing gain of multi-user and multi-data streams, the throughput of the system is significantly improved.

When MU-MIMO serves multiple users with the same time-frequency resource, since different users pass through different channels and there are different degrees of interference between users, the multi-user diversity gain can be obtained only when orthogonal users or users with small interference therebetween perform MU-MIMO transmissions. Therefore, for MU-MIMO transmissions, an effective multi-user pairing process is required to minimize mutual interference between multiple users, so as to obtain high multiplexing gain and ensure the reliability and robustness of wireless link transmission.

In a multi-user pairing process, correlations between every two antenna ports of every two users can be calculated in real time based on pairing criteria of channel correlations, and user pairing is performed by means of correlations between antenna ports of the users.

However, there are multiple users accessed by a base station, and each user may have a plurality of corresponding antenna ports, therefore, the calculation of correlations between every two ports for performing pairing has high computational complexity.

SUMMARY

The embodiments of the present application provide a user pairing method, which may include: obtaining beam domain rasters to which users in a set of paired users belong and a target beam domain raster to which a user to be paired belongs, wherein the beam domain rasters to which the paired users belong are different from the target beam domain raster; obtaining correlations between the target beam domain raster and the beam domain rasters respectively; and in response to that the correlations satisfy a preset condition, adding the user to be paired into the set of paired users.

The embodiments of the present application further provide a user pairing apparatus, which may include: a home beam domain obtaining module, for obtaining beam domain rasters to which users in a set of paired users belong and a target beam domain raster to which a user to be paired belongs, wherein the beam domain rasters to which the paired users belong are different from the target beam domain raster; a correlation obtaining module, for obtaining correlations between the target beam domain raster and the beam domain rasters respectively; and a pairing module, for adding the user to be paired into the set of paired users in response to that the correlations satisfy a preset condition.

The embodiments of the present application further provide an electronic device, which may include: at least one processor; and a memory in communication connection with the at least one processor, wherein the memory stores instructions that can be executed by the at least one processor, and the instructions are executed by the at least one processor so as to enable the at least one processor to implement the above-mentioned user pairing method.

The embodiments of the present application further provide a computer-readable storage medium, storing a computer program, when executed by a processor, implementing the above-mentioned user pairing method.

DETAILED DESCRIPTION

Figure 1:
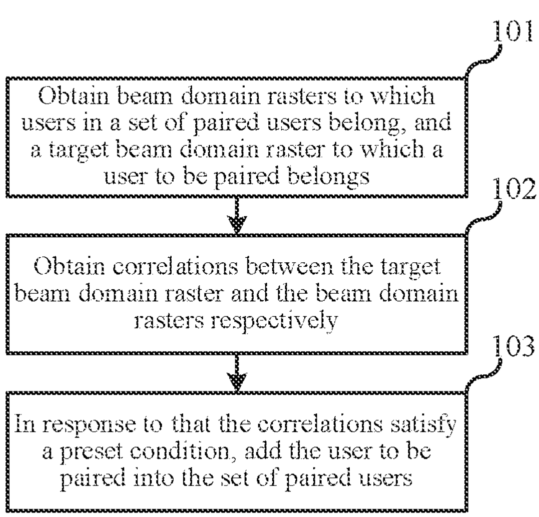
FIG. 1 is a flowchart 1 of a user pairing method in one embodiment according to the present application.

For the purpose of making the objects, technical solutions and advantages of the embodiments of the present application clearer, the embodiments of the present application will be described in detail below with reference to the accompanying drawings. However, those skilled in the art can understand that, in the embodiments of the present application, many technical details are provided so as to enable readers to better understand the present application. However, even without these technical details as well as various changes and modifications based on the following embodiments, the technical solutions claimed in the present application can still be implemented. The division of the following embodiments is for ease of description and should not constitute any limitation on the detailed description of the present application, embodiments can be combined and referenced with each other on the premise that there is no contradiction.

When implementing the MU-MIMO multi-user, the MU-MIMO multi-user pairing technology mainly includes global or local search algorithms, random pairing, and multi-user pairing based on capacity maximization, codebook characteristics, channel correlation and direction of arrival (DOA) estimation information.

Based on search algorithms, when there are a large number of users, the computational complexity is too high to apply in practice.

The random pairing method randomly selects two users for pairing, which is simple to implement but difficult to obtain the maximum multi-user diversity gain and cannot maximize throughput.

The pairing criteria based on capacity maximization require to calculate the channel capacity for every combination paired, which results in high computational complexity and high algorithm overhead.

The pairing criteria based on channel correlations require to constantly calculate correlations between every two antenna ports of every two users, which still has high computational complexity. In order to reduce complexity, users may be selected from a local set, which will result in loss of system performance.

The pairing criteria based on DOA perform pairing by means of the angle information difference between users satisfying a certain threshold value, on one hand, there is a certain error in DOA estimation, on the other hand, the threshold value is difficult to determine, which makes the pairing accuracy low.

In other words, all of the above-mentioned methods have the problems of low pairing accuracy or high computational complexity, and cannot take into account both pairing accuracy and computational complexity.

The main object of the embodiments of the present application is providing a user pairing method and apparatus, an electronic device, and a storage medium, that can reduce the computational complexity of user pairing.

One embodiment of the present application relates a user pairing method, which can be applied to, but not limited to base stations or the like, the user pairing method of this embodiment includes: obtaining beam domain rasters to which users in a set of paired users belong and a target beam domain raster to which a user to be paired belongs, wherein the beam domain rasters to which the paired users belong are different from the target beam domain raster; obtaining correlations between the target beam domain raster and the beam domain rasters respectively; and in response to that the correlations satisfy a preset condition, adding the user to be paired into the set of paired users.

The embodiments of the present application obtain a plurality of beam domain rasters by dividing the spatial beam domain, and obtain beam domain rasters to which users in a set of paired users belong and a target beam domain raster to which a user to be paired belongs, and the target beam domain raster is different from the beam domain rasters to which the paired users belong. Compared with the calculation of correlation coefficients of the ports between channels of every two users, in the embodiments of the present application, users belong to the same beam domain raster do not need to be paired, by means of the correlations between the beam domain rasters, detecting whether the correlations between the beam domain rasters satisfy a preset condition, if satisfied, the user to be paired is paired with users in the set of paired users, and adding the user to be paired into the set of paired users, so as to convert the calculation of interference between users into the calculation of interference of spatial domains, that is, converting the calculation of correlations of ports between channels of every two users into the calculation of correlations of spatial beam domains, thereby reducing search complexity while ensuring user pairing accuracy and obtaining high multiplexing gain.

The implementation details of the user pairing method in this embodiment are described in detail below, the following content is only provided for ease of understanding and is not mandatory for implementing this technical solution. This embodiment can be applied to MU-MIMO technology, single-user multiple-input multiple-output (SU-MIMO) technology, and non-orthogonal multiple access (NOMA) technology.

The specific process of the user pairing method in this embodiment is shown in FIG. 1, including:

step 101, obtaining beam domain rasters to which users in a set of paired users belong, and a target beam domain raster to which a user to be paired belongs, wherein the beam domain rasters to which the paired users belong are different from the target beam domain raster.

Figure 2:
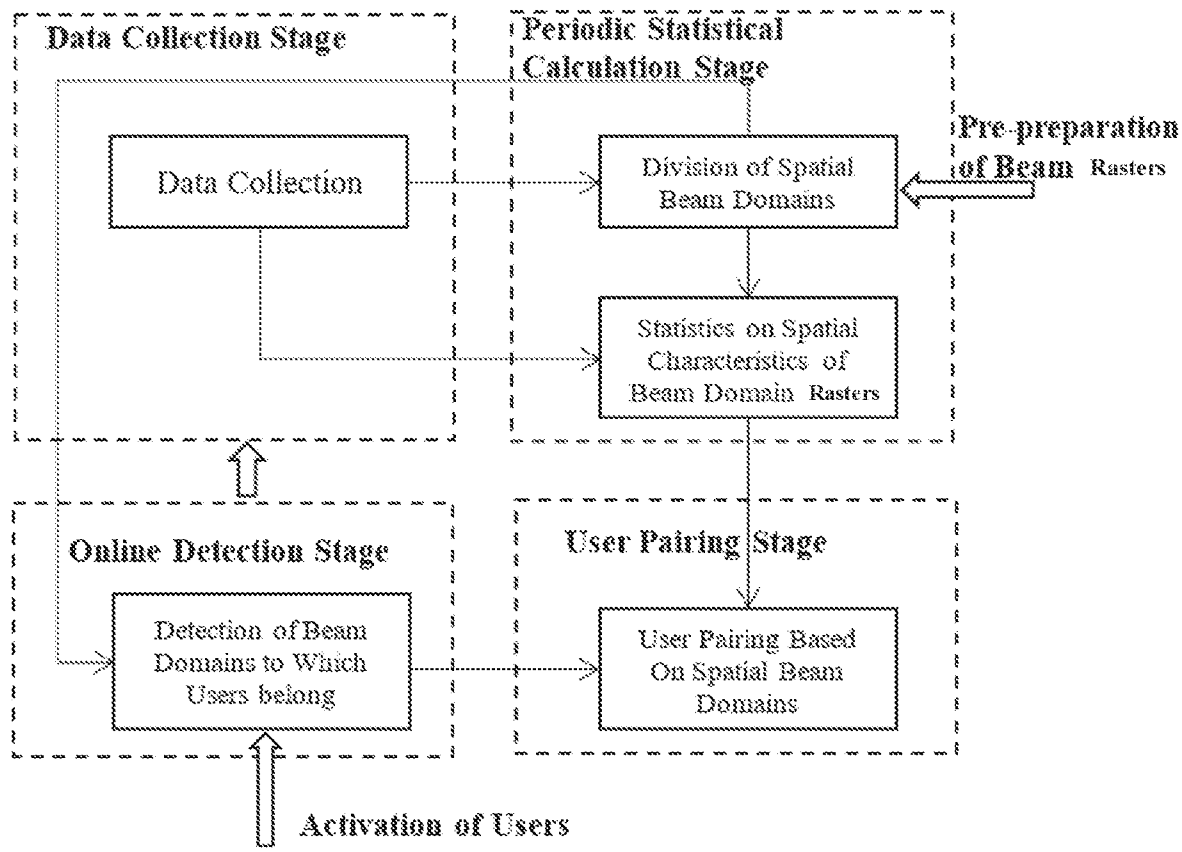
FIG. 2 is a schematic diagram of the interaction between functional units at each stage of the user pairing method provided in one embodiment according to the present application.
Figure 3:
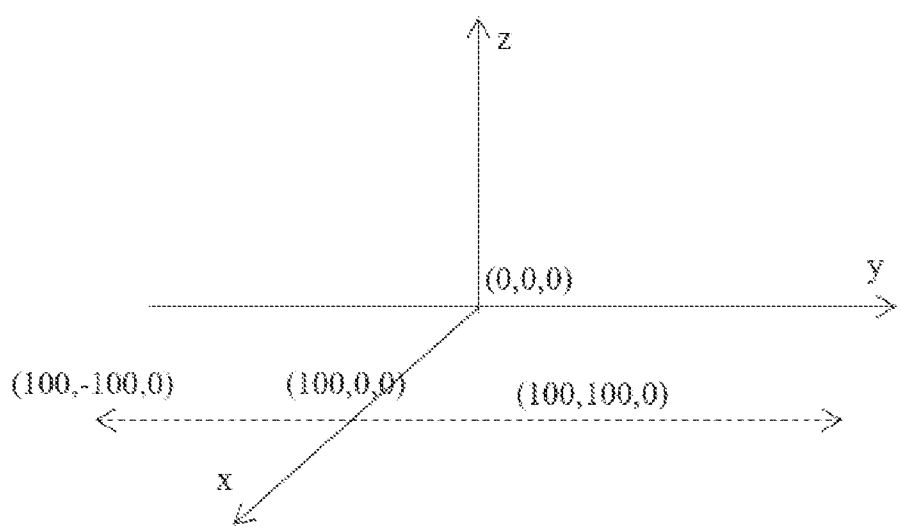
FIG. 3 is a schematic diagram of a multi-user scenario provided in one embodiment according to the present application.
Figure 4:
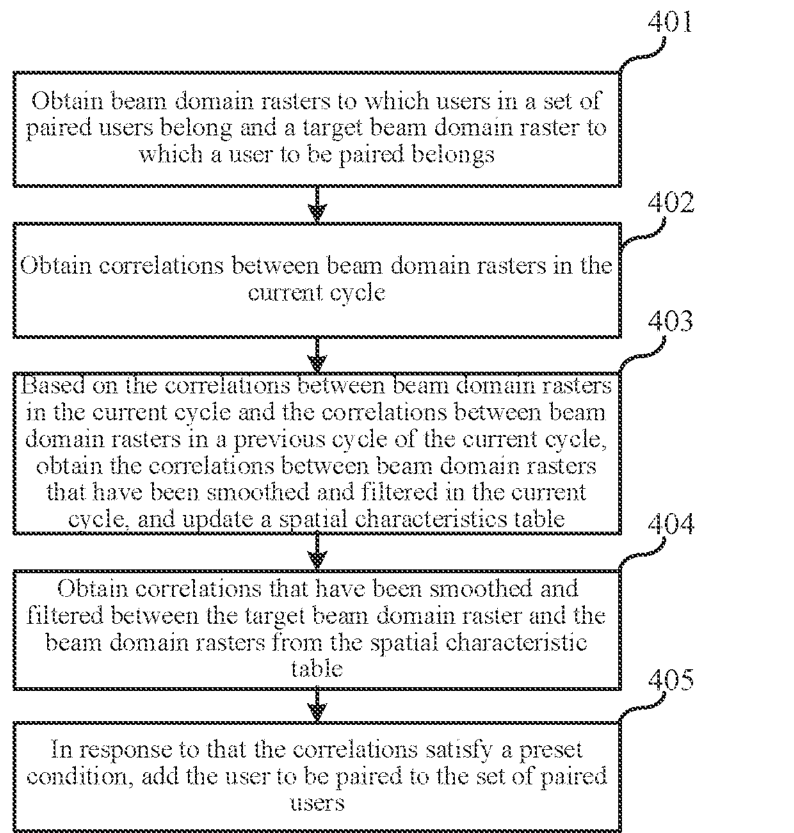
FIG. 4 is a flowchart 2 of a user pairing method provided in another embodiment according to the present application.

In some embodiments, as shown in FIG. 2, in the data collection unit, the base station can collect multi-user channel data to obtain a wide range of data so as to facilitate subsequent statistics on data, the multi-user scenario is shown in FIG. 3. Users in the set of paired users and the user to be paired are users accessed by the base station. A base station can have a plurality of sets of paired users, users in the same set of paired users are successfully paired with each other, that is, users in the same set of paired users can occupy the same time-frequency resource unit and occupy different space resources for data transmission and reception, the beam domain rasters to which users in the same set of paired users belong are different from each other. There are sets of users to be paired in the base station, users to be paired in the set of users to be paired do not belong to any sets of paired users, the target beam domain rasters to which users to be paired belong as selected in embodiments of the present application are different from the beam domain rasters to which users in the set of paired users belong.

In some embodiments, the spatial beam domains can be divided based on the actual coverage of a base station in order to pre-prepare beam domain rasters in the base station. That is, the coverage area of the base station is divided into different areas, and each area can be regarded as a beam domain raster. The division method can be set according to actual needs, and this embodiment is not intended to be limiting. Different users can be divided into different beam domain rasters, for example, the division can be implemented in the following ways:

1) implementing division of space beam domains based on angle domains;
2) implementing division of spatial domains of far, middle and near points by means of angle domains in combination with the coverage area;
3) implementing division of spatial domains by means of angle domains in combination with channel quality indicator (CQI);
4) implementing division of spatial domains by means of neighbor ratios and the number of interfering cells;
5) implementing division of spatial domains based on precoding matrix indicator (PMI) and CQI;
6) implementing division of spatial domains by using the geographical location reported by users.

Exemplarily, if the base station has three-sector coverage, a horizontal radiation range is a range of plus and minus 60 degrees, and a downtilt angle is within the range of plus and minus 15 degrees, the division can be performed in step lengths of 5 degrees horizontally and 5 degrees vertically, the schematic diagram of the divided two-dimensional pre-prepared beam domain rasters is shown in Table 1 below, in which a cell in Table 1 can be regarded as a beam domain raster.

TABLE 1

| | −60 | −55 | 60 |
|---|---|---|---|
| −15 | | . . . | |
| −10 | | . . . | |
| 15 | | . . . | |

After pre-preparing the beam domain rasters and obtaining data accessed by users, a user to be paired can be selected from the set of users to be paired, then the beam domain raster to which the user to be paired belongs can be obtained based on the channel spatial position of the user to be paired, and the beam domain rasters to which paired users belong are obtained based on the channel space positions of users in the set of paired users, if the beam domain raster to which the user to be paired belongs is different from the beam domain rasters to which paired users belong, the beam domain raster to which the user to be paired belongs is the target beam domain raster. For example, the set of paired users includes: user 1, user 2 and user 3, and the beam domain rasters to which they belong are raster 1, raster 2 and raster 3, respectively. If the beam domain raster to which user 4 to be paired belongs is raster 4, and the raster 4 is different from raster 1, raster 2 and raster 3, then the raster 4 is the target beam domain raster; if the beam domain raster to which user 4 to be paired belongs is raster 3, which is the same as the raster 3 to which user 3 in the set of paired users belongs, then the raster to which user 4 to be paired belongs is not the target beam domain raster.

In some embodiments, the beam domain rasters to which users accessed by the base station belong can be calculated; the beam domain rasters to which users belong are stored in a raster table; and the beam domain rasters to which users in the set of paired users belong as well as the target beam domain raster to which the user to be paired belongs are obtained from the raster table. The beam domain rasters to which users in this embodiment belong are stored in a raster table, when the beam domain raster to which a user belongs is needed, it can be directly obtained from the raster table. In other embodiments, the calculation can be performed when it is necessary in order to obtain the beam domain raster to which a user belongs. Compared with performing calculation when it is necessary in order to obtain the beam domain rasters, in this embodiment, the beam domain rasters to which users accessed by the base station belong are calculated so as to update the raster data in real time, which facilitates subsequent calculation of correlations and improves user pairing accuracy and increases pairing efficiency. In addition, it is suitable for calculating a beam domain raster to which a user belongs by using user data in an actual environment, which has a certain degree of statistical significance and improves user gain.

In some embodiments, the beam domain rasters to which users accessed by the base station belong can be calculated in the following ways: obtaining a channel estimation value of a user's channel sounding reference signal and an antenna array mode; obtaining a spatial position of the user's channel based on the channel estimation value of the channel sounding reference signal (SRS) and the antenna array mode; and determining the beam domain raster to which the user belongs based on the spatial position of the channel and the spatial location range of the beam domain raster. The spatial position of the channel can include a horizontal position and a vertical position of the channel. This embodiment uses user data of an actual usage environment, that is, the estimation value of the channel sounding reference signal, to obtain the spatial position range of the channel, which is simpler, more accurate and more effective.

In some embodiments, the spatial position of the channel can be obtained in the following ways: obtaining a vertical covariance matrix and a horizontal covariance matrix of the channel based on the channel estimation value of the channel sounding reference signal and the antenna array mode; obtaining a vertical angle and a horizontal angle of the channel by transforming the vertical covariance matrix and horizontal covariance matrix of the channel in angle domains.

Exemplarily, the vertical covariance matrix $R_v$ and the horizontal covariance matrix $R_h$ of the channel are calculated based on the user's SRS channel estimate value and the antenna array mode. After transforming $R_v$ and $R_h$ in angle domains, searching for the peak value in the angle domains, and calculating a vertical angle θ and a horizontal angle ϕ based on the position of the peak value. Based on the estimated vertical and horizontal angles of the user [θ ϕ], determining the angle range of which raster the user falls within, and then determining the beam domain raster to which the user belongs, for example, as shown in Table 2, which is a raster table of beam domain rasters to which multiple users belong.

TABLE 2

| | | | |
|---|---|---|---|
| φ∈[−60 −56]<br>θ∈[−15 −11] | φ∈[−55 −51]<br>θ∈[−15 −11] | . . .<br>. . . | φ∈[55 59]<br>θ∈[−15 −11] |
| φ∈[−60 −56]<br>θ∈[−10 −6] | φ∈[−55 −51]<br>θ∈[−10 −6] | . . .<br>. . . | φ∈[55 59]<br>θ∈[−10 −6] |
| . . . | . . . | . . . | . . . |
| φ∈[−60 −56]<br>θ∈[10 14] | φ∈[−55 −51]<br>θ∈[10 14] | . . .<br>. . . | φ∈[55 59]<br>θ∈[10 14] |

After obtaining the target beam domain raster and the beam domain rasters to which users in the set of paired users belong, performing step 102.

Step 102: obtaining correlations between the target beam domain raster and the beam domain rasters respectively. Correlations can represent the degree of interference between beam domain rasters, the greater the correlations, the greater the degree of interference.

Exemplarily, if the target beam domain raster is raster 4, and the beam domain rasters are raster 1, raster 2 and raster 3, then obtaining the correlation between raster 4 and raster 1, the correlation between raster 4 and raster 2, and the correlation between raster 4 and raster 3.

In some embodiments, calculating correlations between beam domain rasters in the base station in the current cycle; updating a spatial characteristic table based on the correlations between beam domain rasters in the current cycle, wherein the characteristic table includes the correlations between the beam domain rasters; and obtaining the correlations between the target beam domain raster and the beam domain rasters from the spatial characteristic table. In this embodiment, periodically online performing characteristics statistics between spatial beam domains so as to guide multi-user pairing, which is more in line with the actual environment and improves the actual pairing gain.

It is worth noting that when updating periodically online, periodically performing statistics of user location distribution in the rasters; periodically performing statistics of the PMI distribution of users in the rasters; periodically performing statistics on the CQI distribution of users in the rasters; performing statistics of successfully paired raster combinations. For example, a successfully matched raster combination can be used as a reference combination for subsequent pairing.

In some embodiments, obtaining a vertical covariance matrix and a horizontal covariance matrix of users in the first beam domain raster and the second beam domain raster; calculating a first vertical mean value of the vertical covariance matrix and a first horizontal mean value of the horizontal covariance matrix of users in the first beam domain raster, and a second vertical mean value of the vertical covariance matrix and a second horizontal covariance mean value of the second horizontal mean of the matrix of users in the second beam domain raster; obtaining a horizontal correlation based on the first horizontal mean value and the second horizontal mean value; obtaining a vertical correlation based on the first vertical mean value and the second vertical mean value; and obtaining the correlation between the first beam domain raster and the second beam domain raster based on the horizontal correlation and the vertical correlation.

In some embodiments, certain probability statistics can be performed on a plurality of vertical covariance matrices and horizontal covariance matrices in the first beam domain raster and the second beam domain raster based on the distribution position of the user, and the vertical covariance matrices and the horizontal covariance matrices in the domain with the maximum probability distribution are summed and averaged. This embodiment does not sum and average the vertical covariance matrices or horizontal covariance matrices of all users, by means of probability statistics, the vertical covariance matrices or horizontal covariance matrices in the domain with the maximum probability in the beam domain raster is selected to be summed and averaged so as to obtain the corresponding horizontal mean value and vertical mean value, which minimizes the complexity of the calculation while ensuring the accuracy of calculation.

Exemplarily, if the index of the first beam domain raster is i, obtaining the horizontal covariance matrix $$R_h^{i,p}$$

of the p-th user in the i-th raster, and the vertical covariance matrix $$R_v^{i,p}$$

of the p-th user in the i-th raster, wherein i represents the raster index, $N_i$ represents the number of users in the i-th raster, and p is the user index in the i-th raster, p=0, 1, . . . , $N_i-1$.

The first horizontal mean value of the horizontal covariance matrix of users in the i-th raster $$R_h^i = \frac{1}{N_i}\sum_{p=0}^{N_i-1} R_h^{i,p};$$

the first vertical mean value of the vertical covariance matrix of users in the i-th raster $$R_v^i = \frac{1}{N_i}\sum_{j=0}^{N_i-1} R_v^{i,p};$$

the second beam domain, that is, the second horizontal mean value of the horizontal covariance matrix of users in the j-th raster is denoted as $$R_h^j;$$

the second vertical mean value of the vertical covariance matrix of users in the j-th raster is denoted as $$R_V^j;$$

obtaining the horizontal correlation based on the first horizontal mean value and the second horizontal mean value, the formula is as follows:

$$\rho_{i,j}^h = \frac{\sum_{k=0}^{M\cdot M-1} R_h^i(k)\cdot\left(R_h^j(k)\right)^*}{\sqrt{\sum_{k=0}^{M\cdot M-1}\left|R_h^i(k)\right|^2}\cdot\sqrt{\sum_{k=0}^{M\cdot M-1}\left|R_h^j(k)\right|^2}};$$

obtaining the vertical correlation based on the first vertical mean value and the second vertical mean value, the formula is as follows:

$$\rho_{i,j}^v = \frac{\sum_{k=0}^{N\cdot N-1} R_v^i(k)\cdot\left(R_v^j(k)\right)^*}{\sqrt{\sum_{k=0}^{N\cdot N-1}\left|R_v^i(k)\right|^2}\cdot\sqrt{\sum_{k=0}^{N\cdot N-1}\left|R_v^j(k)\right|^2}};$$

wherein N is the number of vertical matrices, M is the number of horizontal matrices, and k is the element index in a covariance matrix.

Obtaining the correlation between the first beam domain raster and the second beam domain raster based on the horizontal correlation and the vertical correlation, the formula is as follows:

$$\rho_{i,j} = \min\left(\rho_{i,j}^h, \rho_{i,j}^v\right);$$

that is, selecting the minimum value from the horizontal correlation and the vertical correlation as the correlation between the first beam domain raster and the second beam domain raster.

In other embodiments, correlating users in the first beam domain raster with users in the second beam domain raster in pairs so as to obtain a plurality of correlation values; obtaining the correlation between the first beam domain raster and the second beam domain raster based on the average value of the plurality of correlation values.

Exemplarily, $N_i$ users in the i-th raster and $N_j$ users in the j-th raster can also be correlated in pairs to obtain $N_i \times N_j$ correlation values, and then the $N_i \times N_j$ correlation values are summed and averaged to obtain correlation value between the i-th raster and the j-th raster, that is, the correlation $\rho_{i,j}$.

Step 103, in response to that the correlations satisfy a preset condition, adding the user to be paired into the set of paired users.

In some embodiments, the preset conditions satisfied by the correlations include: in response to that the correlations between the target beam domain raster to which the user to be paired belongs and the beam domain rasters to which users in the set of paired users belong are all less than a preset threshold value, the user to be paired can be added to the set of paired users, that is, the user to be paired is successfully paired with users in the paired set.

Exemplarily, the target beam domain raster to which the user to be paired belongs is b1, and the beam domain rasters to which users in the set of paired users belong are a1 and a2; the correlation between b1 and a1 is less than the preset threshold value 0.4, and the correlation between b1 and a2 is less than the preset threshold value 0.4, which means that the preset conditions are satisfied and a user to be paired corresponding to the target beam domain raster b1 can be added to the existing set A1 of paired users.

In other embodiments, the preset conditions satisfied by the correlations include: in the set of users to be paired, in response to that the sum of correlations between the target beam domain raster to which a user to be paired belongs and the beam domain rasters to which users in the set of paired users belong is the minimum, and the minimum sum of correlations is less than a preset threshold value, then the user to be paired can be added to the set of paired users.

For ease of understanding, take the following case as an example to briefly describes how to determine whether the preset condition is satisfied, in which a set of paired users consists of 3 users, user 1, user 2, and user 3, and a set of users to be paired consists of 3 users, user 5, user 6, and user 7, this example is not intended to limit this embodiment.

The correlation between user 5 to be paired and users in the set of paired users is denoted as $\rho_{5,1}$, $\rho_{5,2}$, $\rho_{5,3}$, respectively, and the sum of correlations R1=$\rho_{5,1}+\rho_{5,2}+\rho_{5,3}$;

the correlation between user 6 to be paired and users in the set of paired users is denoted as $\rho_{6,1}$, $\rho_{6,2}$, $\rho_{6,3}$, respectively, and the sum of correlations R2=$\rho_{6,1}+\rho_{6,2}+\rho_{6,3}$;

the correlation between user 7 to be paired and users in the set of paired users is denoted as $\rho_{7,1}$, $\rho_{7,2}$, $\rho_{7,3}$, respectively, and the sum of correlations R2=$\rho_{7,1}+\rho_{7,2}+\rho_{7,3}$;

the minimum sum of correlations Rmin=min {the sum of correlations R1, the sum of correlations R2, the sum of correlations R3}, and the minimum sum of correlations Rmin is less than the preset threshold value.

In other embodiments, the preset conditions satisfied by the correlations include: in response to that the maximum of correlations between the target beam domain raster to which a user to be paired belongs and the beam domain rasters to which users in the set of paired users belong is less than a preset threshold value Thr1, and the sum of correlations is less than a preset threshold value Thr2, then the user to be paired can be added to the set of paired users.

For example, the set of paired users consists of 3 users, user 1, user 2, and user 3, and the set of users to be paired consists of 3 users, user 5, user 6, and user 7.

The correlations between user 5 to be paired and users in the set of paired users is denoted as $\rho_{5,1}$, $\rho_{5,2}$, $\rho_{5,3}$, respectively, the maximum correlation value=max {$\rho_{5,1}$, $\rho_{5,2}$, $\rho_{5,3}$}, the sum of correlations R1=$\rho_{5,1}+\rho_{5,2}+\rho_{5,3}$, if the maximum correlation value is less than the preset threshold value Thr1, and the sum of correlations R1 is less than the preset threshold value Thr2, then the user 5 to be paired can be added to the set of paired users 1, 2, 3, that is, users 1, 2, 3, 5 can belong to the same set.

It is worth noting that there may be a plurality of users to be paired in the set of users to be paired that belong to the same beam domain raster, then a user to be paired can be selected from the plurality of users to be paired based on the user's SINR, PMI, CQI or the like and added to the set of paired users, alternatively, a user can be randomly selected to be added to the set of paired users. For example, in the set of users to be paired, the users to be paired corresponding to the target beam domain raster are c1, c2 and c3, then a user to be paired such as c1 is selected and added to the set of paired users. Users' SINR, PMI, CQI or the like can also be stored in the spatial characteristic table and updated periodically.

The user pairing process is illustrated in combination with an application scenario below. Referring to FIG. 2, in the data collection stage, collecting user data in real time; in the online detection stage, detecting online the beam domains to which a user accessed by the base station belongs; in the periodic statistical calculation stage, dividing the spatial beam domains, pre-preparing beam domain rasters, and performing statistics on the spatial characteristics of the beam domain rasters so as to obtain a spatial characteristics table of the beam domain rasters, wherein the spatial characteristics table can store correlations with the beam domain rasters, as well as the PMI and CQI of users in the beam domain rasters or the like; in the user pairing stage, performing user pairing based on the spatial beam domains, which can be shown as follows:

1. There are a set A of paired users and a set B of users to be paired.
2. In the initial state, the set A only includes main users.
3. Detecting the indexes of beam domain rasters to which users in set A belong, and the indexes of beam domain rasters to which users in set B belong.
4. Based on the indexes of beam domain rasters of users in set A and set B, querying the spatial characteristics table to obtain correlations between these rasters.

The pairing criterion adopted in this embodiment is: the correlations between rasters of a user in set B and all users in set A are all less than a preset threshold value. In this embodiment, the threshold value is set to 0.4, if the correlations are less than this threshold, the pairing condition is satisfied and the user can be added to the set A of paired users.

5. Repeating this process until the number of users in set A reaches a preset number of paired users or all users in set B have been selected.

In this embodiment, spatial characteristics statistics between spatial beam domains are periodically performed online so as to guide multi-user pairing, which is more in line with an actual environment and improves actual pairing gain. By dividing the spatial beam domains and online detecting beam domains to which users belong, it helps reduce user pairing complexity and improves user pairing accuracy in the application of MU-MIMO technology. Moreover, users in the same beam domain do not need to be paired, which effectively reduces the range of users to be paired and reduces search complexity. In addition, by means of covariance matrices or beamforming weight vectors of channels, firstly performing statistical averaging or selecting the part with the maximum probability for statistical averaging based on probability statistics, and then calculating correlations between spatial beam domains, which greatly reduces the computational complexity.

An embodiment of the present application provides another user pairing method, the user pairing method in this embodiment is substantially the same as that in the above-mentioned embodiments, the difference lies in that, in this embodiment, the beam-domain rasters to which a user belongs and correlations are calculated by means of a downlink beamforming weight vector, and after obtaining correlations between beam-domain rasters in the current cycle, updating the space characteristics table in combination with correlations between beam-domain rasters in a previous cycle.

Step 401, obtaining beam domain rasters to which users in a set of paired users belong and a target beam domain raster to which a user to be paired belongs.

In some embodiments, the beam domain raster to which a user belongs is obtained based on the spatial position of the channel, and the spatial position of the channel can be obtained in the following ways: obtaining a vertical component and a horizontal component of the downlink beamforming weight vector based on the channel estimation value of the channel sounding reference signal and the antenna array mode; and obtaining a vertical angle and a horizontal angle of the channel by transforming the vertical component and the horizontal component of the downlink beamforming weight vector in angle domains.

Exemplarily, calculating the vertical component $V_v$ and horizontal component $V_h$ of the downlink beamforming weight vector based on the user's SRS channel estimate value and the antenna array mode. After transforming $V_v$ and $V_h$ in angle domains, searching for the peak value in the angle domains, and calculating the vertical angle θ and horizontal angle ϕ based on the position of the peak value. Based on the estimated vertical and horizontal angles [θ ϕ] of the user, determining the angle range of which raster the user falls within, thereby determining the beam domain raster to which the user belongs. The beam domain raster to which the users in the set of paired users and the set of users to be paired can be determined by the above-mentioned method.

Step 402: obtaining correlations between beam domain rasters in the current cycle.

In some embodiments, obtaining downlink beamforming weight vectors of users in the first beam domain raster and the second beam domain raster respectively, calculating the mean value of the first downlink beamforming weight vectors of the first beam domain raster and the mean value of the second downlink beamforming weight vectors of the second beam domain raster, and calculating correlations between the first beam domain raster and the second beam domain raster based on the mean value of the first downlink beamforming weight vectors and the mean value of the second downlink beamforming weight vectors.

Exemplarily, if the index of the first beam domain raster is i, obtaining the downlink beamforming weight vector $V_1$ of the p-th user in the i-th raster, calculating the mean value of the first downlink beamforming weight vectors of the first beam domain raster, which is as follows:

$$V_1^i = \frac{1}{N_i}\sum_{p=0}^{N_i-1} V_1^{i,p};$$

in which i represents the raster index, $N_i$ represents the number of users in the i-th raster, p is the user index in the i-th raster, p=0, 1, . . . , $N_i-1$.

$$V_1^{i,j}$$

represents the first column vector of the beamforming weight vector of the j-th user in the i-th raster;

if the index of the second beam domain raster is j, obtaining the mean value of the second downlink beamforming weight vector $$V_1^j;$$

calculating correlations between the first beam domain raster and the second beam domain raster based on the mean value of the first downlink beamforming weight vectors and the mean value of the second downlink beamforming weight vectors, the formula is as follows:

$$\rho_{i,j} = \frac{\sum_{k=0}^{N_{Rx}-1} V_1^i(k)\cdot\left(V_1^j(k)\right)^*}{\sqrt{\sum_{k=0}^{N_{Rx}-1}\left|V_1^i(k)\right|^2}\cdot\sqrt{\sum_{k=0}^{N_{Rx}-1}\left|V_1^j(k)\right|^2}};$$

in which $N_{Rx}$ is the number of antennas, index k=0, 1, . . . , $N_{Rx}-1$, $$V_1^i$$

represents the beamforming weight vector of the i-th raster, that is, the first downlink beamforming weight vector, $$V_1^j$$

represents the beamforming weight vector of the j-th raster, that is, the second downlink beamforming weight vector.

In some embodiments, certain probability statistics can be performed on the downlink beamforming weight vectors of a plurality of users in the i-th raster based on the users' distribution positions, taking $V_1$ in the area with the largest probability distribution for summing and averaging, thereby obtaining the mean value.

The correlations between beam domain rasters in the current cycle can be obtained by the above-mentioned method, then step 403 is performed.

Step 403: Based on the correlations between beam domain rasters in the current cycle and the correlations between beam domain rasters in a previous cycle of the current cycle, obtaining the correlations between beam domain rasters that have been smoothed and filtered in the current cycle, and updating the spatial characteristics table.

Exemplarily, the correlation between the beam domain raster i and the beam domain raster j in the current cycle is denoted as $\rho_{i,j}$, the correlation between the beam domain raster i and the beam domain raster j that has been smoothed and filtered in the previous cycle is denoted as $$\rho_{i,j}^{c-1},$$

the correlation between the beam domain raster i and the beam domain raster j that has been smoothed and filtered in the current cycle is denoted as $$\rho_{i,j}^{c},$$

the equation is as follows:

$$\rho_{i,j}^{c} = \alpha \cdot \rho_{i,j}^{c-1} + (1-\alpha) \cdot \rho_{i,j};$$

after obtaining the correlation between the beam domain raster i and the beam domain raster j that has been smoothed and filtered in the current cycle $$\rho_{i,j}^{c},$$

storing $$\rho_{i,j}^{c}$$

in the spatial characteristic table. Compared with directly using the correlation in the current cycle $\rho_{i,j}$, this embodiment obtains the correlation that has been smoothed and filtered in the current cycle in combination with the correlation that has been smoothed and filtered in a previous cycle, which can improve the precision and further improve the accuracy of pairing. The spatial characteristics table storing correlations that have been smoothed and filtered may be referred to as the filtered spatial characteristics table for short.

In other embodiments, statistics can be performed on the degree of interference between spatial beam domains based on the correlations between users reported by a physical layer, alternatively, statistics can be performed on some other spatial characteristics in combination with information that is successfully reported by historical transmissions, such as statistics on spatial rasters with relatively good pairing performance, user distribution within spatial rasters or the like, alternatively, statistics can be performed on spatial characteristics based on machine learning.

Step 404, obtaining correlations that have been smoothed and filtered between the target beam domain raster and the beam domain rasters from the spatial characteristic table.

Exemplarily, if the target beam domain raster is raster 1, and the beam domain rasters are raster 2 and raster 3, then obtaining $$\rho_{1,2}^{c} \text{ and } \rho_{1,3}^{c}$$

from the spatial characteristics table.

Step 405, in response to that the correlations satisfy a preset condition, adding the user to be paired to the set of paired users.

Step 405 is generally the same as step 103 and will not be described again in this embodiment.

The user pairing process is illustrated in combination with an application scenario below.

1. There are a set A of paired users and a set B of users to be paired in a base station.
2. In the initial state, the set A only includes main users.
3. Detecting the indexes of beam domain rasters to which users in set A belong, and the indexes of beam domain rasters to which users in set B belong.
4. Querying the spatial characteristics table based on the indexes of beam domains of users in set A and set B. The spatial characteristics table stores correlations that have been smoothed and filtered between the beam domain rasters.

The pairing criterion adopted in this embodiment is: the correlations between a user in set B and all users in set A are all less than a preset threshold value. In this embodiment, the threshold value is set to 0.4, if the correlations are less than this threshold, the pairing condition is satisfied and the user can be added to set A of paired users.

5. Repeating this process until the number of users in set A reaches a preset number of paired users or all users in set B have been selected.

This embodiment divides the coverage area of the base station into different beam domain rasters, and performs user pairing by the beam domain rasters, which ensures the accuracy of user pairing while minimizes the computational complexity. Moreover, this embodiment calculates correlations by beamforming weight vectors, which is simple and further reduces the computational complexity. In addition, the correlations between the beam domain rasters stored in the spatial characteristics table of this embodiment are smoothed and filtered, that is, noise can be eliminated by referring to correlations in adjacent cycles, which makes the calculated correlations more accurate, thereby making user pairing more accurate.

Figure 5:
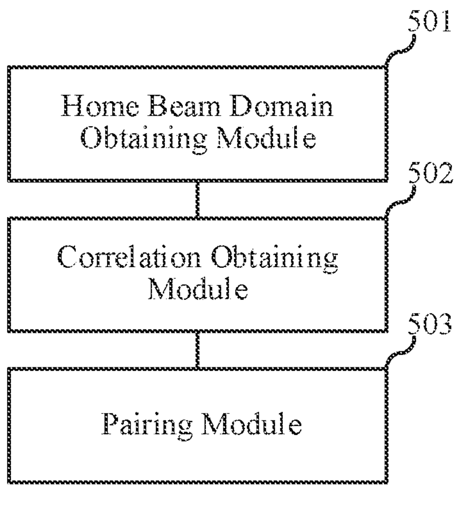
FIG. 5 is a schematic diagram of a user pairing apparatus provided in another embodiment according to the present application.

Another embodiment of the present application relates to a user pairing apparatus, FIG. 5 is a schematic diagram of the user pairing apparatus according to this embodiment, including: a home beam domain obtaining module 501, a correlation obtaining module 502 and a pairing module 503; the home beam domain obtaining module 501 is configured to obtain beam domain rasters to which users in a set of paired users belong and a target beam domain raster to which a user to be paired belongs, wherein the beam domain rasters to which the paired users belong are different from the target beam domain raster; the correlation obtaining module 502 is configured to obtain correlations between the target beam domain raster and the beam domain rasters; and the pairing module 503 is configured to add the user to be paired into the set of paired users in response to that the correlations satisfy a preset condition.

In some embodiments, the home beam domain obtaining module 501 is configured to calculate the beam domain rasters to which users accessed by the base station belong; store the beam domain rasters to which users belong in a raster table; and obtain the beam domain rasters to which users in the set of paired users belong as well as the target beam domain raster to which the user to be paired belongs from the raster table.

In some embodiments, the home beam domain obtaining module 501 is configured to obtain a channel estimation value of the user's channel sounding reference signal and an antenna array mode; obtain a spatial position of the user's channel based on the channel estimation value of the channel sounding reference signal and the antenna array mode; and determine the beam domain raster to which the user belongs based on the spatial position of the channel and the spatial location range of the beam domain raster.

In some embodiments, the home beam domain obtaining module 501 is configured to obtaining a vertical covariance matrix and a horizontal covariance matrix of the channel based on the channel estimation value of the channel sounding reference signal and the antenna array mode; and obtain a vertical angle and a horizontal angle of the channel by transforming the vertical covariance matrix and horizontal covariance matrix of the channel in angle domain.

In some embodiments, the home beam domain obtaining module 501 is configured to obtain a vertical component and a horizontal component of a downlink beamforming weight vector based on the channel estimation value of the channel sounding reference signal and the antenna array mode; and obtain the vertical and horizontal angles of the channel by transforming the vertical component and the horizontal component of the downlink beamforming weight vector in angle domains.

In some embodiments, the correlation obtaining module 502 is configured to calculate correlations between beam domain rasters in the base station in the current cycle; update the spatial characteristics table based on the correlations between beam domain rasters in the current cycle, wherein the characteristics table includes the correlations between beam domain rasters; and obtain the correlations between the target beam domain raster and the beam domain rasters from the spatial characteristic table.

In some embodiments, the correlation obtaining module 502 is configured to obtain the vertical covariance matrix and the horizontal covariance matrix of users in the first beam domain raster and the second beam domain raster in the current cycle respectively; calculate the first vertical mean value of the vertical covariance matrix and the first horizontal mean value of the horizontal covariance matrix of users in the first beam domain raster and the second vertical mean value of the vertical covariance matrix and the second horizontal covariance mean value of the second horizontal mean of the matrix of users in the second beam domain raster; obtain a horizontal correlation based on the first horizontal mean value and the second horizontal mean value; obtain a vertical correlation based on the first vertical mean value and the second vertical mean value; and obtain the correlation between the first beam domain raster and the second beam domain raster based on the horizontal correlation and the vertical correlation.

In some other embodiments, the correlation obtaining module 502 is configured to obtain a plurality of correlations by correlating users in the first beam domain raster with users in the second beam domain raster in the current cycle in pairs respectively; obtain the correlation between the first beam domain raster and the second beam domain raster based on the average value of the plurality of correlations.

In some embodiments, the correlation obtaining module 502 is configured to obtain correlations between beam domain rasters that have been smoothed and filtered in the current cycle based on correlations between beam domain rasters in the current cycle and correlations between beam domain rasters that have been smoothed and filtered in a previous cycle of the current cycle; update the spatial characteristics table based on the correlations between beam domain rasters that have been smoothed and filtered in the current cycle; and obtain correlations between the target beam domain raster and the beam domain rasters that have been smoothed and filtered from the spatial characteristics table.

It is not difficult to find out that this embodiment is a system embodiment corresponding to the above-mentioned method embodiment, and this embodiment can be implemented in cooperation with the above-mentioned method embodiment. The relevant technical details and technical effects mentioned in the above-mentioned embodiment are still valid in this embodiment, in order to reduce duplication, they will not be described again here. Accordingly, the relevant technical details mentioned in this embodiment can also be applied to the above-mentioned embodiment.

It is worth noting that modules involved in this embodiment are logical modules. In practical applications, a logical unit can be implemented as a physical unit or a part of a physical unit or a combination of a plurality of physical units. In addition, in order to highlight the inventive part of the present application, units that are not closely related to solving the technical problems raised by the present application are not introduced in this embodiment, but this does not preclude the presence of other units in this embodiment.

Figure 6:
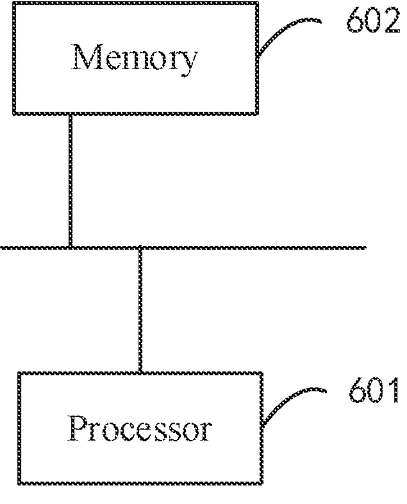
FIG. 6 is a schematic diagram of an electronic device provided in another embodiment according to the present application.

Another embodiment of the present application relates to an electronic device, as shown in FIG. 6, including: at least one processor 601; and a memory 602 in communication connection with the at least one processor 601; wherein the memory 602 stores instructions that can be executed by the at least one processor 601, and the instructions are executed by the at least one processor 601 so as to enable the at least one processor 601 to execute the above-mentioned user pairing method in the above-mentioned embodiments.

The memory and the processor are connected by a bus, the bus can include any number of interconnected buses and bridges, and the bus connects various circuits of the one or more processors and the memory together. The bus can also connect various other circuits together, such as peripheral devices, voltage regulators, and power management circuits, which are all well known in the art and therefore will not be described further herein. A bus interface provides an interface between a bus and a transceiver. A transceiver can be one or more element(s), such as a plurality of receivers and transmitters, which provides units for communicating with various other apparatus over transmission medium. Data that has been processed by a processor is transmitted over wireless medium by an antenna, further, the antenna also receives data and transmits data to the processor.

The processor is responsible for managing the bus and general processing, and can also provide a variety of functions, including timing, peripheral interfaces, voltage regulation, power management, and other control functions. Memory can be used to store data used by the processor when performing operations.

Another embodiment of the present application relates to a computer-readable storage medium storing a computer program. The computer program implements the above-mentioned method embodiments when being executed by a processor.

That is, those skilled in the art can understand that all or part of the steps in the methods of the above-mentioned embodiments can be completed by instructing relevant hardware with a program which is stored in a storage medium and includes several instructions so as to enable a device (it can be a microcontroller, chip, etc.) or a processor to execute all or part of the steps of the methods described in various embodiments of the present application. The above-mentioned storage medium include: USB drive, mobile hard drive, read-only memory (ROM), random access memory (RAM), magnetic disk or optical disk and other media that can store program codes.

Those skilled in the art can understand that the above-mentioned embodiments are specific embodiments for implementing the present application, and in practical applications, various changes can be made in form and details without departing from the scope of the present application.

What is claimed is:

1. A user pairing method, applied to a base station, the user pairing method comprising:

obtaining beam domain rasters to which users in a set of paired users belong, and a target beam domain raster to which a user to be paired belongs, wherein the beam domain rasters to which the paired users belong are different from the target beam domain raster;

obtaining correlations between the target beam domain raster and the beam domain rasters respectively; and in response to that the correlations satisfy a preset condition, adding the user to be paired into the set of paired users;

wherein, prior to obtaining correlations between the target beam domain raster and the beam domain rasters, the method further comprising:

calculating correlations between beam domain rasters in the base station in a current cycle; and updating a spatial characteristic table based on the correlations between beam domain rasters in a current cycle, wherein the spatial characteristic table comprises the correlations between beam domain rasters:

obtaining correlations between the target beam domain raster and the beam domain rasters comprising:

obtaining correlations between the target beam domain raster and the beam domain rasters from the spatial characteristic table.

2. The user pairing method according to claim 1, wherein, prior to obtaining beam domain rasters to which users in a set of paired users belong, and a target beam domain raster to which a user to be paired belongs, the method comprising:

calculating beam domain rasters to which users accessed by the base station belong; and storing the beam domain rasters to which users belong in a raster table;

obtaining beam domain rasters to which users in a set of paired users belong, and a target beam domain raster to which a user to be paired belongs comprising:

obtaining beam domain rasters to which users in a set of paired users belong, and a target beam domain raster to which a user to be paired belongs from the raster table.

3. The user pairing method according to claim 2, wherein, calculating beam domain rasters to which users accessed by the base station belong comprising:

obtaining a channel estimation value of the user's channel sounding reference signal and an antenna array mode;

obtaining a spatial position of the user's channel based on the channel estimation value of the channel sounding reference signal and the antenna array mode; and determining the beam domain raster to which the user belongs based on the spatial position of the channel and a spatial location range of the beam domain raster.

4. The user pairing method according to claim 3, wherein, obtaining a spatial position of the user's channel based on the channel estimation value of the channel sounding reference signal and the antenna array mode comprising:

obtaining a vertical covariance matrix and a horizontal covariance matrix of the channel based on the channel estimation value of the channel sounding reference signal and the antenna array mode; and obtaining a vertical angle and a horizontal angle of the channel by transforming the vertical covariance matrix and the horizontal covariance matrix of the channel in an angle domain.

5. The user pairing method according to claim 3, wherein, obtaining a spatial position of a channel to which a user belongs based on the channel estimation value of the channel sounding reference signal of the channel to which the user belongs and the antenna array mode comprises:

obtaining a vertical component and a horizontal component of a downlink beamforming weight vector based on the channel estimation value of the channel sounding reference signal and the antenna array mode; and obtaining a vertical angle and a horizontal angle of the channel by transforming the vertical component and the horizontal component of the downlink beamforming weight vector in an angle domain.

6. An electronic device, comprising:

at least one processor; and a memory in communication connection with the at least one processor;

wherein the memory stores instructions that can be executed by the at least one processor, and the instructions are executed by the at least one processor so as to enable the at least one processor to implement the user pairing method according to claim 1.

7. A non-transitory computer-readable storage medium, storing a computer program, when executed by a processor, implementing the user pairing method according to claim 1.

8. The user pairing method according to claim 2, wherein, prior to obtaining correlations between the target beam domain grid and the beam domain grids, the method further comprising:

calculating correlations between beam domain grids in the base station in the current cycle; and updating a spatial characteristic table based on the correlations between beam domain grids in the current cycle, wherein the spatial characteristic table comprises the correlations between beam domain grids;

obtaining correlations between the target beam domain grid and the beam domain grids comprising:

obtaining correlations between the target beam domain grid and the beam domain grids from the spatial characteristic table.

9. The user pairing method according to claim 3, wherein, prior to obtaining correlations between the target beam domain grid and the beam domain grids, the method further comprising:

calculating correlations between beam domain grids in the base station in the current cycle; and updating a spatial characteristic table based on the correlations between beam domain grids in the current cycle, wherein the spatial characteristic table comprises the correlations between beam domain grids;

obtaining correlations between the target beam domain grid and the beam domain grids comprising:

obtaining correlations between the target beam domain grid and the beam domain grids from the spatial characteristic table.

10. The user pairing method according to claim 4, wherein, prior to obtaining correlations between the target beam domain grid and the beam domain grids, the method further comprising:

calculating correlations between beam domain grids in the base station in the current cycle; and updating a spatial characteristic table based on the correlations between beam domain grids in the current cycle, wherein the spatial characteristic table comprises the correlations between beam domain grids;

obtaining correlations between the target beam domain grid and the beam domain grids comprising:

obtaining correlations between the target beam domain grid and the beam domain grids from the spatial characteristic table.

11. The user pairing method according to claim 5, wherein, prior to obtaining correlations between the target beam domain grid and the beam domain grids, the method further comprising:

calculating correlations between beam domain grids in the base station in the current cycle; and updating a spatial characteristic table based on the correlations between beam domain grids in the current cycle, wherein the spatial characteristic table comprises the correlations between beam domain grids;

obtaining correlations between the target beam domain grid and the beam domain grids comprising:

obtaining correlations between the target beam domain grid and the beam domain grids from the spatial characteristic table.

12. The user pairing method according to claim 11, wherein, calculating correlations between beam domain rasters in the base station in the current cycle comprising:

obtaining a vertical covariance matrix and a horizontal covariance matrix of users in a first beam domain raster and a second beam domain raster in the current cycle respectively;

calculating a first vertical mean value of the vertical covariance matrix and a first horizontal mean value of the horizontal covariance matrix of users in the first beam domain raster, and a second vertical mean value of the vertical covariance matrix and a second horizontal covariance mean value of the second horizontal mean of the matrix of users in the second beam domain raster;

obtaining a horizontal correlation based on the first horizontal mean value and the second horizontal mean value;

obtaining a vertical correlation based on the first vertical mean value and the second vertical mean value; and obtaining correlations between the first beam domain raster and the second beam domain raster based on the horizontal correlation and the vertical correlation.

13. The user pairing method according to claim 11, wherein, calculating correlations between beam domain rasters in the base station in the current cycle comprising:

obtaining a plurality of correlations by correlating users in a first beam domain raster with users in a second beam domain raster in the current cycle in pairs respectively;

obtaining a correlation between the first beam domain raster and the second beam domain raster based on the average value of the plurality of correlations.

14. The user pairing method according to claim 11, wherein, updating a spatial characteristic table based on the correlations between beam domain rasters in the current cycle comprising:

obtaining correlations between beam domain rasters that have been smoothed and filtered in the current cycle, based on correlations between beam domain rasters in the current cycle and correlations between beam domain rasters that have been smoothed and filtered in the previous cycle of the current cycle; and updating a spatial characteristic table based on the correlations between beam domain rasters that have been smoothed and filtered in the current cycle;

obtaining the correlations between the target beam domain raster and the beam domain rasters from the spatial characteristic table comprising:

obtaining the correlations that have been smoothed and filtered between the target beam domain raster and the beam domain rasters from the spatial characteristic table.

15. The user pairing method according to claim 12, wherein, updating a spatial characteristic table based on the correlations between beam domain grids in the current cycle comprising:

obtaining correlations between beam domain grids that have been smoothed and filtered in the current cycle, based on correlations between beam domain grids in the current cycle and correlations between beam domain grids that have been smoothed and filtered in the previous cycle of the current cycle; and updating a spatial characteristic table based on the correlations between beam domain grids that have been smoothed and filtered in the current cycle;

obtaining the correlations between the target beam domain grid and the beam domain grids from the spatial characteristic table comprising:

obtaining the correlations that have been smoothed and filtered between the target beam domain grid and the beam domain grids from the spatial characteristic table.

16. The user pairing method according to claim 13, wherein, updating a spatial characteristic table based on the correlations between beam domain grids in the current cycle comprising:

obtaining correlations between beam domain grids that have been smoothed and filtered in the current cycle, based on correlations between beam domain grids in the current cycle and correlations between beam domain grids that have been smoothed and filtered in the previous cycle of the current cycle; and updating a spatial characteristic table based on the correlations between beam domain grids that have been smoothed and filtered in the current cycle;

obtaining the correlations between the target beam domain grid and the beam domain grids from the spatial characteristic table comprising:

obtaining the correlations that have been smoothed and filtered between the target beam domain grid and the beam domain grids from the spatial characteristic table.

17. A user pairing apparatus, comprising:

at least one processor; and a memory in communication connection with the at least one processor;

wherein the memory stores instructions executable by the at least one processor to cause the at least one processor to perform a user pairing method, the user pairing method comprising:

obtaining beam domain rasters to which users in a set of paired users belong, and a target beam domain raster to which a user to be paired belongs, wherein the beam domain rasters to which the paired users belong are different from the target beam domain raster;

obtaining correlations between the target beam domain raster and the beam domain rasters respectively; and in response to that the correlations satisfy a preset condition, adding the user to be paired into the set of paired users;

wherein, prior to obtaining correlations between the target beam domain raster and the beam domain rasters, the method further comprising:

calculating correlations between beam domain rasters in the base station in a current cycle; and updating a spatial characteristic table based on the correlations between beam domain rasters in a current cycle, wherein the spatial characteristic table comprises the correlations between beam domain rasters;

obtaining correlations between the target beam domain raster and the beam domain rasters comprising:

obtaining correlations between the target beam domain raster and the beam domain rasters from the spatial characteristic table.

* * * * *